United States Patent [19]
Palkes

[11] 4,112,918
[45] Sep. 12, 1978

[54] SOLAR ENERGY COLLECTOR
[75] Inventor: Mark Palkes, East Hampton, Conn.
[73] Assignee: Exxon Research & Engineering Co., Linden, N.J.
[21] Appl. No.: 773,706
[22] Filed: Mar. 2, 1977
[51] Int. Cl.² .............................................. F24J 3/02
[52] U.S. Cl. ................................................... 126/270
[58] Field of Search ................................. 126/270, 271

[56] References Cited
U.S. PATENT DOCUMENTS

| | | | |
|---|---|---|---|
| 2,595,905 | 5/1952 | Telkes | 126/271 |
| 3,048,375 | 8/1962 | Walker | 126/270 |
| 3,972,316 | 8/1976 | Alkasab | 126/271 |
| 3,990,635 | 11/1976 | Restle et al. | 126/270 |
| 4,002,159 | 1/1977 | Angilletta | 126/270 |
| 4,028,008 | 6/1977 | Shelton | 126/271 |
| 4,034,736 | 7/1977 | Telkes | 126/270 |

Primary Examiner—Carroll B. Dority, Jr.
Attorney, Agent, or Firm—Joseph J. Dvorak

[57] ABSTRACT

This invention features a mechanism within a flat plate solar collector for modulating the temperature therein by reflecting incident solar radiation with a solar reflective surface and as a function of the temperature within the flat plate collector. The mechanism comprises a movable solar reflective surface which is positioned so as to permit at least partial and preferably complete exposure of a solar energy absorbing surface within the collector when the temperature within the flat plate collector is at a predetermined low level and it is positioned, preferably automatically, so as to at least partially and preferably completely reflect incident solar radiation when the temperature within the flat plate collector is above a predetermined high temperature level.

6 Claims, 7 Drawing Figures

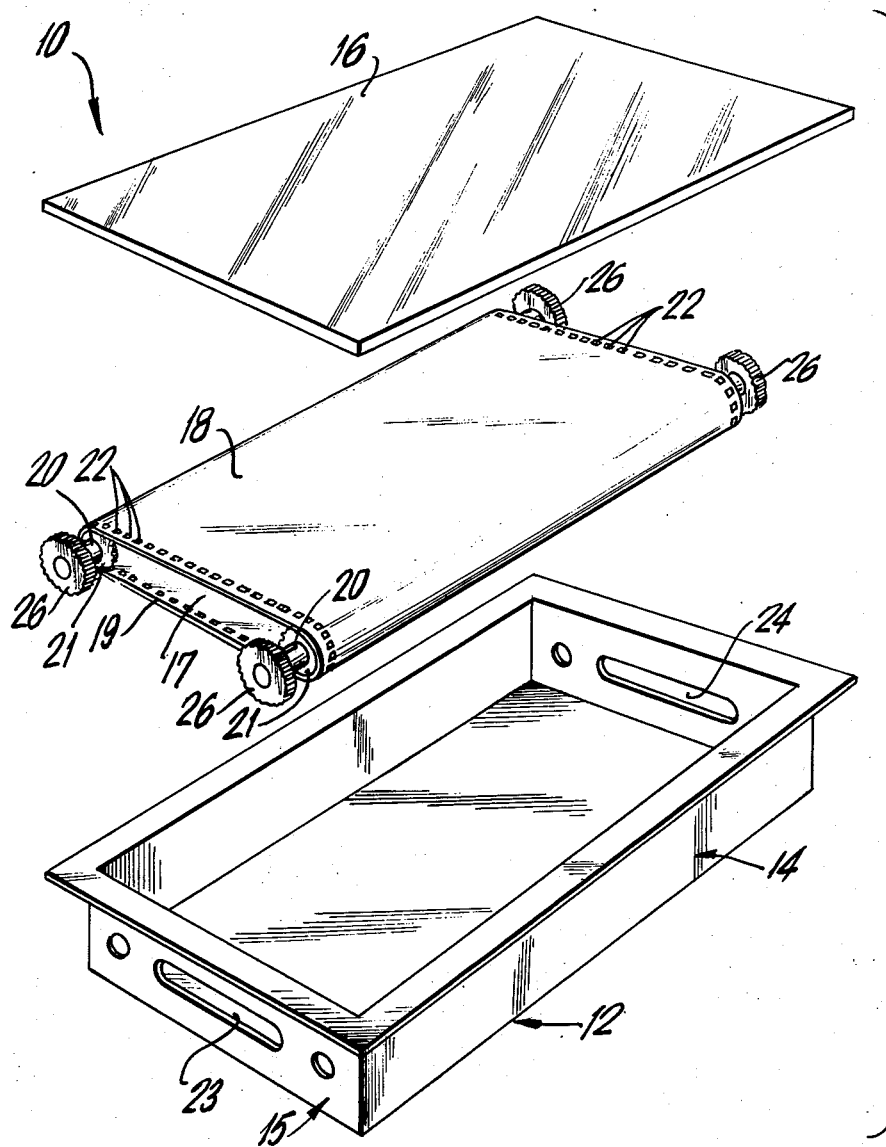
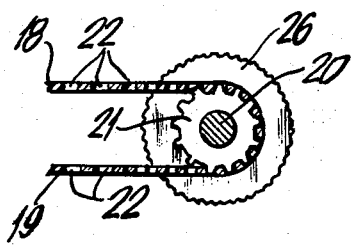
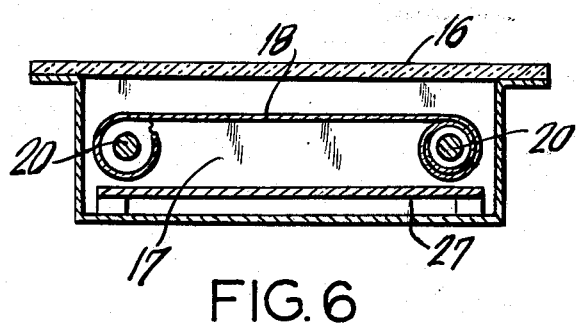
FIG. 5   FIG. 6

SOLAR ENERGY COLLECTOR

BACKGROUND OF THE INVENTION

1. Field of the Invention

This invention relates to a solar heat collector.

2. Description of the Prior Art

Numerous devices have been proposed for utilizing solar energy as a source of heat, particularly for domestic home heating needs. Commercialization of such devices, however, has been inhibited because of the typically high initial capital costs of the solar heating systems presently available. For example, a solar thermal collector is typically constructed of expensive materials which will sustain working pressures of 125 psi at temperatures above 190° F. since the temperatures within such collectors can be quite high, indeed even above 300° F., as the heating load requirement of the collector system decreases. In other words, collectors have been designed to withstand temperatures and pressures under no flow or stagnant conditions; and such designed collectors require expensive coatings and materials of construction. Thus, there remains a need for a solar heat collector which is not only simple in construction but lower in cost, thereby overcoming some of the drawbacks of the solar heat collectors of the prior art.

SUMMARY OF THE INVENTION

Briefly stated, this invention features a mechanism within a flat plate solar collector for modulating the temperature therein by reflecting incident solar radiation with a solar reflective surface and as a function of the temperature within the flat plate collector. The mechanism comprises a movable solar reflective surface which is positioned so as to permit at least partial and preferably complete exposure of a solar energy absorbing surface within the collector when the temperature within the flat plate collector is at a predetermined low level and it is positioned, preferably automatically, so as to at least partially and preferably completely reflect incident solar radiation when the temperature within the flat plate collector is above a predetermined high temperature level.

BRIEF DESCRIPTION OF THE DRAWINGS

FIG. 4 is an isometric view of a flat plate collector of this invention including the glass cover, particularly showing the movable solar reflector in accordance with one embodiment of the present invention.

FIG. 5 is a fragmentary cross-sectional view taken along line 5—5 of FIG. 4.

FIG. 6 is a cross-sectional view of a flat plate solar collector having a movable solar reflector surface for a flat plate collector in accordance with an alternate embodiment of the present invention.

DESCRIPTION OF THE INVENTION

Figure 1:
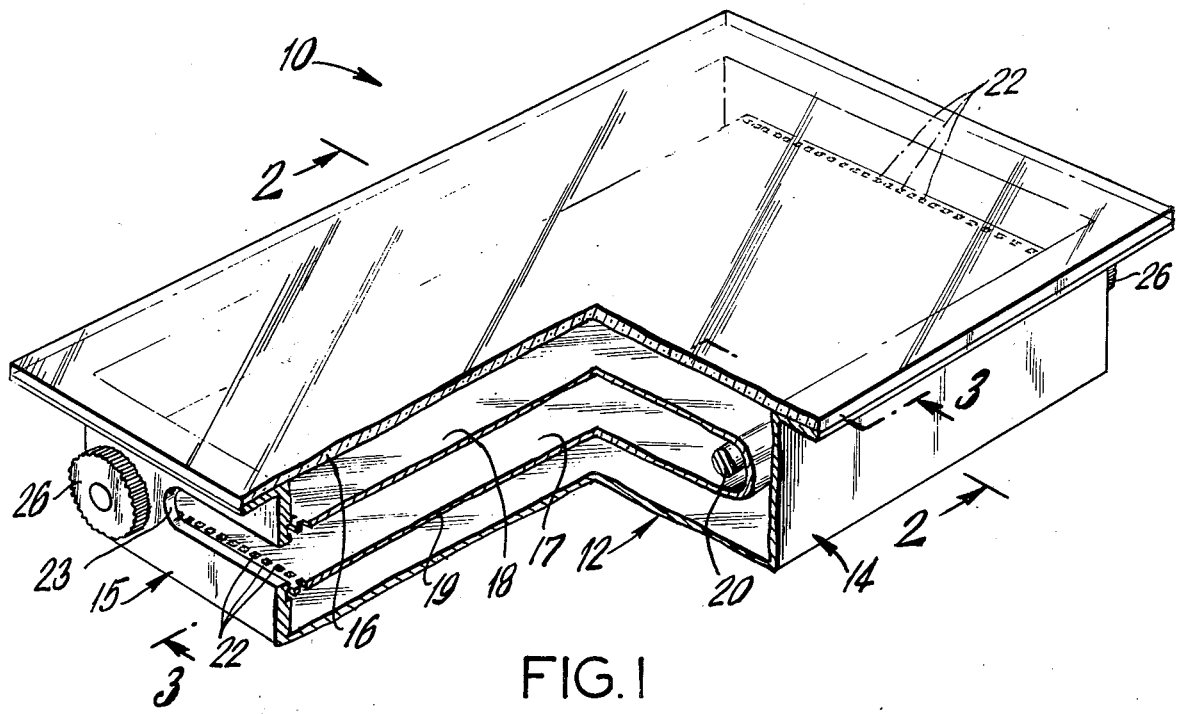
FIG. 1 is a perspective view of a flat plate solar heat collector unit constructed in accordance with the teachings of the present invention and having portions removed for the purposes of clarity.
Figure 2:
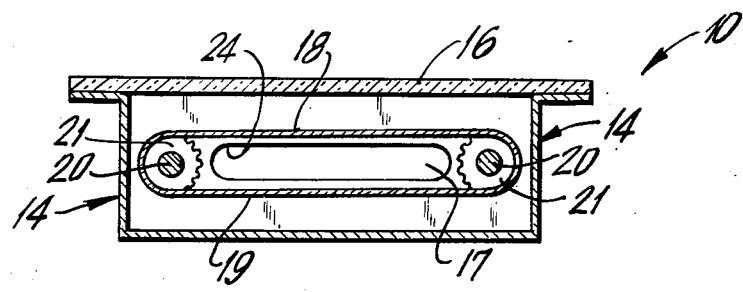
FIG. 2 is a cross-sectional view of the solar heat collector unit taken along line 2—2 of FIG. 1.
Figure 3:
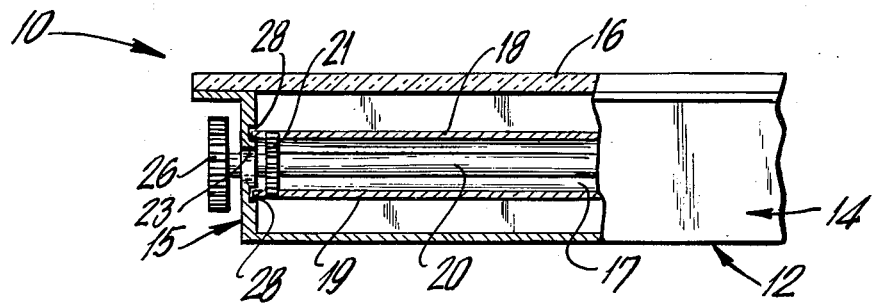
FIG. 3 is a fragmentary cross-sectional view taken along line 3—3 of FIG. 1.

Referring now to the drawings and particularly with reference to FIGS. 1, 2 and 3, the flat plate solar heat collector 10 of this invention includes a generally rectangular frame 12 having upwardly extending side walls 14 and end walls 15. Any material can be used in fabricating the rectangular frame; however, it is particularly preferred in the practice of the present invention that the rectangular frame be formed from a lightweight thermally insulating inexpensive material. For example, the frame 12 can be formed from a glass fiber reinforced polyurethane foam having the requisite structural strength and thermal insulating characteristics. Other materials can also be employed.

The solar heat collector 10 includes a cover plate 16 thereby defining a chamber between the cover plate 16 and the base of frame 12. The cover plate is made of any material which is generally transparent to solar radiation. Typically, cover plate 16 is made of glass or clear plastic.

A movable solar energy reflecting surface 18 is located within the chamber of flat plate collector 10. In the embodiment shown in FIGS. 1, 2 and 3, the reflective surface covers one-half of an endless belt. The other half of the endless belt is coated with a solar energy absorbing material. The solar energy absorbing surface of the endless belt is shown generally as reference numeral 19. As can be seen in FIGS. 1 through 4, when the reflecting surface 18 is facing upwardly in the direction of the incident solar radiation, then the absorbing surface 19 is facing downwardly.

Any material which is capable of reflecting solar radiation may be used as the reflecting surface material. For example, silver paint and other types of metallic coatings may be applied on the endless belt. In contrast thereto, the absorbing surface generally will be painted black or will contain a dark absorbing coating that has a high solar absorptivity. It is desirable that this coating also have a low emissivity. Such coating materials are well known in the art as selective absorber coatings.

Typically, the endless belt will be made of a material which will readily transfer or conduct heat to the fluid surrounding it. For example, the belt can be a thin metallic member of aluminum, steel or the like.

The endless belt with its reflecting and absorbing surface is mounted over a pair of rollers such as rollers 20, for example, having drive means such as gears 21 with raised gear teeth for engaging openings 22 in the marginal edges of the endless belt. The absorbing and reflecting surfaces as they are positioned over the rollers 20 define a channel or plenum 17 between the surfaces for the passage of a heat transfer fluid such as air or water.

Fluid inlet 23 is located in one end 15 of flat plate collector 10 which communicates with the plenum 17. At the opposite end of the flat plate collector 10 there is an outlet 24 communicating with the fluid plenum defined by the reflecting and absorbing surfaces.

Manifold means (not shown) mounted in communication with inlet 23 and outlet 24 can be provided to connect a plurality of solar collectors 10 in parallel relationship. Alternatively, a manifold or other suitable device (not shown) can be provided to communicate with inlet 23 and outlet 24 and to permit the serial connection of a plurality of collectors 10.

Optionally and preferably, fan or pump means (not shown) are provided for circulating the heat transfer fluid through the inlet of the solar collector and outwardly to a source or point of use of such heated fluid.

Rollers 20 are journaled in the end walls 15 of solar collector 10 and extend outwardly to be operatively connected to drive means such as gear wheel 26 which can be optionally chain-driven by a motor (not shown). Also, optionally and preferably located within the solar collector 10 is a thermal detector (not shown) such as a thermocouple probe for sensing the temperature of the fluid in the collector. Alternatively, a temperature sensor can be located on the surface of the collector 10, the temperature of which can be related to the fluid temperature in the collector.

In operation, when the temperature of the solar energy collector 10, or optionally and preferably the temperature of the fluid in the collector, falls below a predetermined selected temperature, say, for example, 75° F., the reflecting surface 18 is moved such that it faces downwardly in the solar collector and the absorbing surface 19 faces upwardly. This change of position can be done manually; however, it is preferred that the position of the reflecting surface 18 be changed automatically in response to an appropriate signal from the thermal detector located within collector 10 and operably connected to an automatic means for switching on a drive mechanism for the movable solar reflecting surface, thereby moving the reflecting surface 18 so as to face downwardly and the absorbing surface 19 to face upwardly. Thus, with the absorbing surface 19 facing upwardly to receive incident solar radiation, the fluid within the solar collector will be heated. Natural convection will cause the fluid to circulate through the collector 10 to a point of use external the collector 10. Preferably, however, at a predetermined higher temperature detected, for example, by a thermocouple probe, the heated fluid will be circulated by pump or fan means.

At any point in time when there is a lack of demand for heated fluid and the circulating means are turned off, the temperature will begin to increase within the solar collector 10 to even higher temperatures. At a predetermined elevated temperature, say at a temperature above about 220° F., as detected with the thermocouple, the reflecting surface 18 is moved into position so as to reflect the incident solar radiation, thereby decreasing the stagnant fluid temperature within the solar collector. Again, repositioning of the reflecting surface can be automated so as to operate in response to thermal conditions existing within the collector.

As will be readily appreciated, the positioning of the reflecting surface can be varied between a partial to full reflecting and a partial to full absorbing surface, thereby offering the ability to more accurately control or modulate the temperature within the solar collector. However, for most purposes, it is adequate that upon reaching a predetermined elevated temperature and a predetermined lower temperature, the movable surface can be positioned between full reflecting and full absorbing condition.

As can be seen in FIG. 3, it is particularly desirable to provide grooves or rabbet cuts 28 in end walls 15 of the solar thermal collector to accommodate the marginal edges of the endless belt with its absorbing and reflecting surfaces and to provide a fluid seal for the fluid in fluid plenum 17.

In the alternate embodiment shown in FIG. 6, the solar absorbing surface 27 is permanently fixed within the solar collector; however, the solar reflecting surface is mounted over rollers and has tape means for winding the reflector so as to substantially cover the absorbing surface at points in time when the temperature in the solar collector exceeds a predetermined maximum temperature. The heat transfer fluid, such as air, is circulated over the solar absorbing surface 27. Alternatively, surface 27 can be applied to a heat transfer plate through which a heat transfer fluid such as water is circulated.

Figure 7:
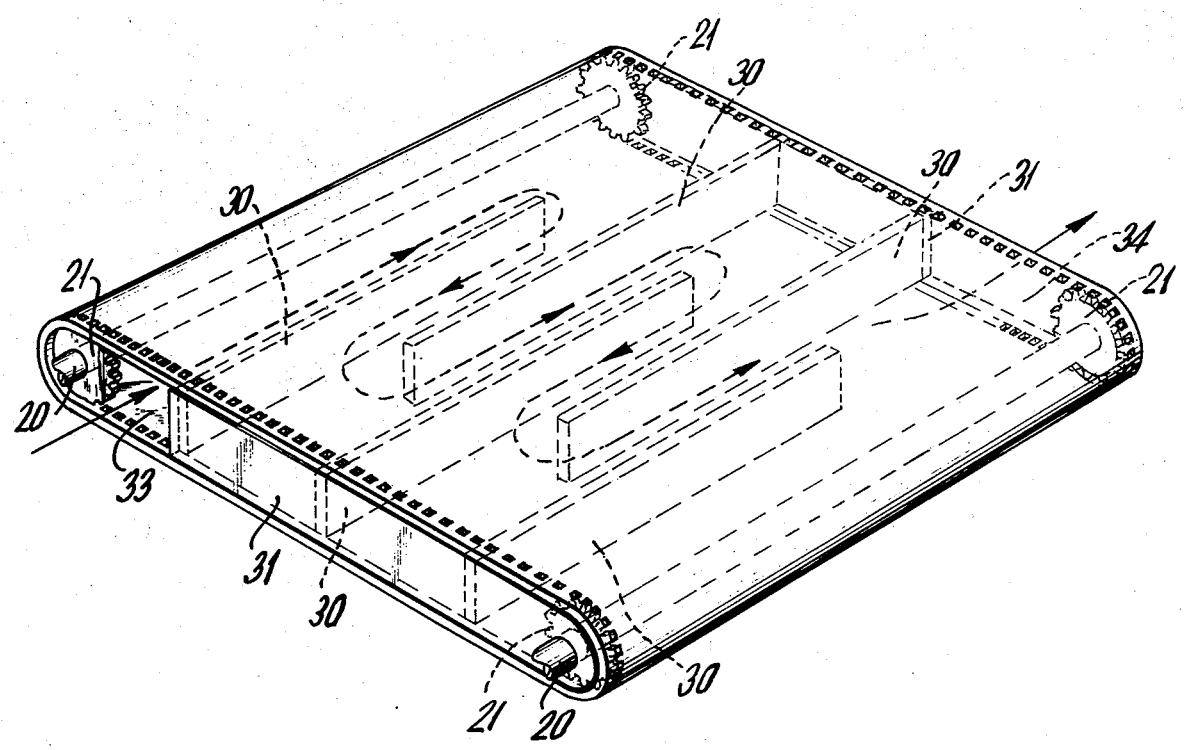
FIG. 7 is a schematic diagram showing a movable solar reflector having baffles disposed therein to define a fluid flow path in a fluid plenum.

For greater heat transfer efficiency and especially when air is the working fluid, baffles can be located within the fluid plenum 17. As is seen in FIG. 7, baffles 30 are mounted on end plates 31 thereby defining a tortuous path through which the fluid must flow in route from the inlet to outlet of the collector. The end plates can be mounted on end walls 15 of frame 12, for example. The inlet 23 and outlet 24 of frame 12, then, of course, are sized and positioned to correspond with the inlet 33 and outlet 34 of the fluid plenum.

What is claimed is:

1. A solar heat collector, comprising:
    a generally rectangular frame having a base and end walls and side walls extending upwardly therefrom;
    a generally rectangular cover plate transparent to solar radiation disposed on top of said frame defining a chamber between the base and the cover plate;
    a solar absorbing surface disposed within said chamber in heat transfer relationship with a fluid in said chamber;
    an inlet and an outlet in the end walls of said frame communicating with said chamber;
    a movable solar reflecting surface located within said chamber, said solar reflecting surface being a flexible stratum capable of being rolled and having geared teeth engaging openings in the marginal edges thereof;
    a roll located in said chamber to which said stratum is operatively connected, whereby said stratum is rolled around said roll when said surface is positioned to expose said solar absorbing surface;
    means for positioning said movable reflective surface so as to at least partially cover said solar absorbing surface when the temperature within the collector exceeds a predetermined high temperature whereby incident solar energy is at least partially reflected thereby; and
    means for positioning said movable reflective surface so as to at least partially expose said solar absorbing surface when the temperature within the collector falls below a predetermined minimum temperature whereby incident solar energy is at least partially absorbed thereby.

2. The collector of claim 1 including means for circulating fluid through said chamber in heat relationship with said solar absorbing surface and out therefrom to a point of use.

3. A flat plate solar collector comprising:
    a generally rectangular frame having a base and end walls and side walls extending upwardly therefrom;
    a generally rectangular cover plate transparent to solar radiation disposed on top of said frame defining a chamber between the base and the cover plate;
    a pair of rollers journaled in the side walls of said frame;

an endless belt horizontally disposed within said chamber and around said rollers defining a fluid plenum in between the belt, said belt having half the exterior surface thereof coated with a solar energy reflective material and the remaining exterior surface coated with a solar absorbing material;

means for rotating said belt whereby said solar reflective surface and said solar absorbing surface can be positioned to at least partially reflect incident solar radiation and to at least partially absorb incident solar radiation thereby modulating the collector temperature.

4. The collector of claim 3 wherein said endless belt can be positioned in a first position to completely reflect incident solar radiation and can be positioned in a second position to completely absorb incident solar radiation.

5. The collector of claim 3 wherein the side walls have grooves to receive the marginal edges of the endless belt in a sealing relationship.

6. The collector of claim 5 including baffles extending inwardly from the side walls of the frame into a region between the endless belt defining therein a tortuous path for the flow of fluid.

* * * * *